United States Patent [19]
Podd et al.

[11] Patent Number: 5,547,331
[45] Date of Patent: Aug. 20, 1996

[54] METHOD FOR LOADING BULK MATERIAL INTO A CARGO CONTAINER WITH AN AERATION/VACUUM LINER PAD SYSTEM

[76] Inventors: Stephen D. Podd, One Lincoln Blvd., Rouses Point, N.Y. 12979; Victor I. Podd, 1678 SW. 20th Ave., Boca Raton, Fla. 33486

[21] Appl. No.: 210,252

[22] Filed: Mar. 16, 1994

Related U.S. Application Data

[62] Division of Ser. No. 950,469, Sep. 24, 1992, abandoned.

[51] Int. Cl.⁶ .................................................. B65G 65/30
[52] U.S. Cl. ...................... 414/786; 414/291; 414/293; 414/298; 141/59; 141/10; 141/65; 141/67; 141/114; 406/90
[58] Field of Search .................. 141/59, 65, 67, 141/10, 114; 414/786, 291, 287, 288, 298, 293, 507; 406/86, 88–91, 151–153; 410/68

[56] References Cited

U.S. PATENT DOCUMENTS

| | | |
|---|---|---|
| 2,708,602 | 5/1955 | Galle . |
| 3,214,221 | 10/1965 | Finnegan .................. 141/67 X |
| 3,788,368 | 1/1974 | Geng et al. ................. 141/67 |
| 3,951,284 | 4/1976 | Fell et al. . |
| 4,133,451 | 1/1979 | Ratter . |
| 4,185,669 | 1/1980 | Jevakohoff ................. 141/59 |
| 4,470,749 | 9/1984 | Koudstaal . |
| 4,671,733 | 6/1987 | Krein . |
| 4,872,493 | 10/1989 | Everman ................... 141/67 X |
| 4,911,317 | 3/1990 | Schloesser et al. . |
| 4,966,310 | 10/1990 | Hawkins ................... 141/10 X |
| 5,040,693 | 8/1991 | Podd, Sr. et al. . |
| 5,193,710 | 3/1993 | Podd, Sr. et al. . |
| 5,199,826 | 4/1993 | Lawrence . |
| 5,244,332 | 9/1993 | Krein et al. . |
| 5,279,339 | 1/1994 | Derby ...................... 141/65 X |
| 5,291,922 | 3/1994 | Martin et al. ............... 141/65 X |

FOREIGN PATENT DOCUMENTS

| | | |
|---|---|---|
| 650159 | 7/1964 | Belgium . |
| 751539 | 6/1970 | Belgium . |
| 1205106 | 5/1986 | Canada . |
| 2023649 | 8/1970 | France . |
| 1084646 | 6/1960 | Germany . |
| 1178634 | 9/1964 | Germany ................. 141/59 |
| 1211107 | 2/1966 | Germany . |
| 1431356 | 5/1969 | Germany . |
| 1297024 | 6/1969 | Germany . |
| 2027842 | 1/1971 | Germany . |
| 2012071 | 9/1971 | Germany . |
| 1759733 | 9/1992 | U.S.S.R. ................. 141/114 |
| 1089874 | 11/1967 | United Kingdom . |
| 2116938 | 10/1983 | United Kingdom . |

*Primary Examiner*—Karen B. Merritt
*Assistant Examiner*—Stephen Gordon

[57] ABSTRACT

An air permeable pad to help load a bulk cargo into or unload a bulk cargo from a cargo container including a body and a hose. The body, in turn, includes a first, gas permeable layer and a second, gas impermeable layer. The two layers of the body are connected together and form an interior and a seal extending around that interior. The hose is connected to the body of the pad in communication with the interior thereof to conduct gas into or out from that interior. In use, one or more of these pads is installed in or on a cargo container or vehicle to help load a bulk cargo into the container and/or to help unload a bulk cargo from the container. More specifically, to help load a bulk cargo into a container, air is drawn from that cargo, via the air permeable pads and associated hoses, to compact the cargo therein, reducing the volume of space occupied by a given mass of the bulk cargo. To help unload a bulk cargo from a container, air is conducted into the bulk cargo via one or more air permeable pads to aerate and agitate the bulk cargo therein.

7 Claims, 8 Drawing Sheets

FIG. 12
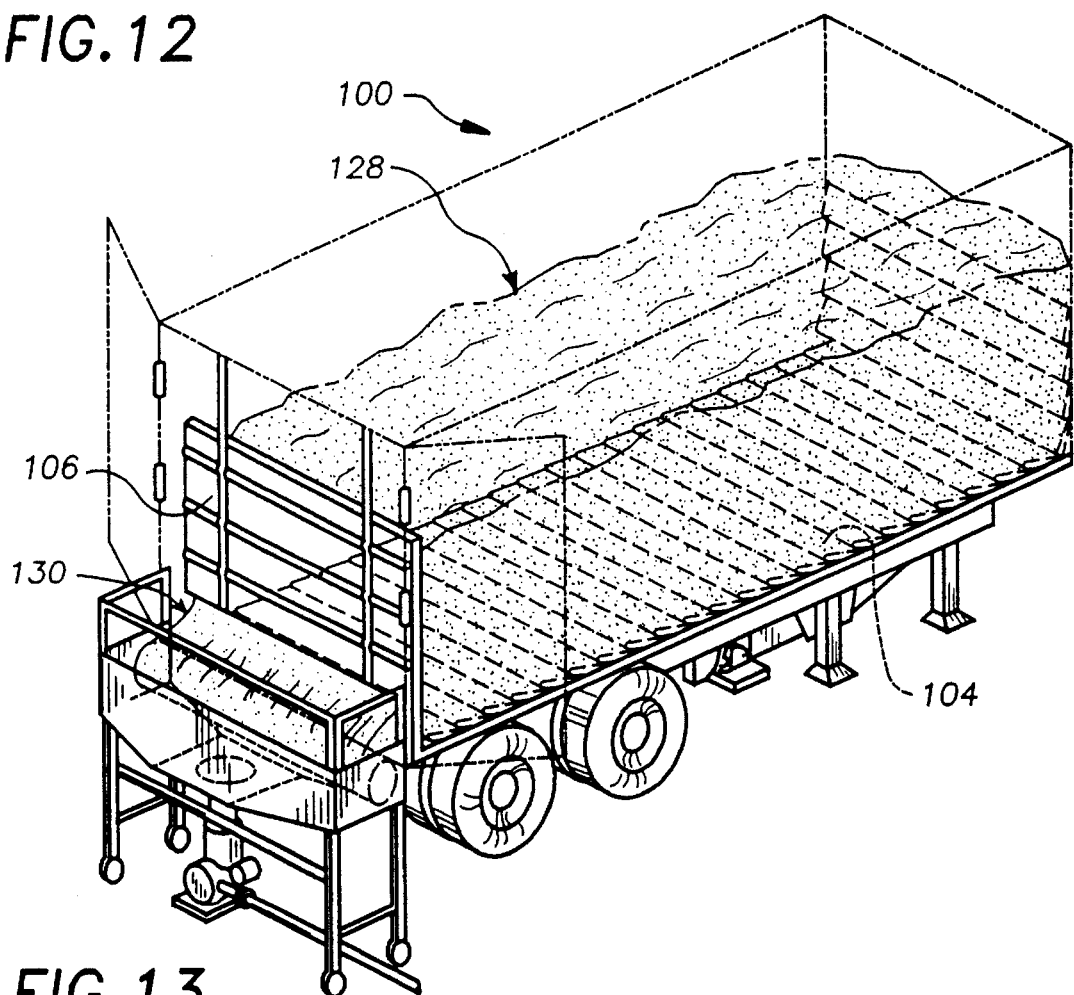
FIG. 13
FIG. 14
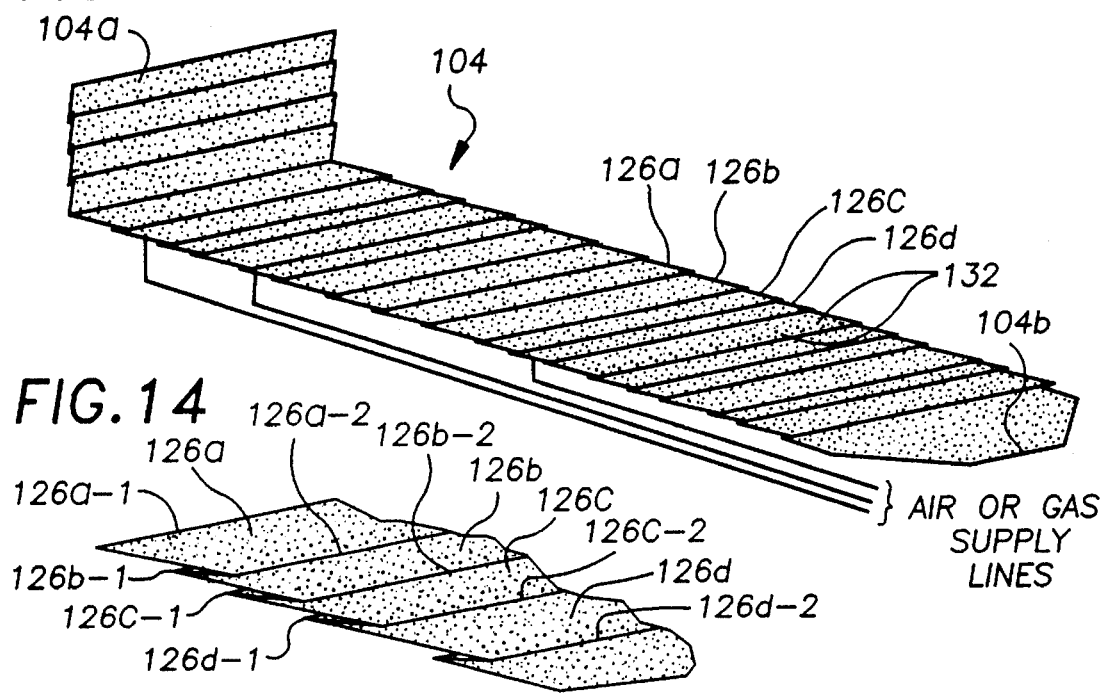

METHOD FOR LOADING BULK MATERIAL INTO A CARGO CONTAINER WITH AN AERATION/VACUUM LINER PAD SYSTEM

This application is a division of application Ser. No. 07/950,469, filed on Sept. 24, 1992 and now abandoned.

FIELD OF THE INVENTION

This invention generally relates to transporting bulk cargo. More specifically, it relates to apparatus to help load bulk cargo into and/or to help unload bulk cargo from a vehicle or transportable container.

BACKGROUND OF THE INVENTION

Many types of materials are often transported in bulk in vehicles or transportable containers. For example, for many years, granular materials such as sand, gravel, and dirt, as well as brush and tree trimmings, have been carried in the cargo areas of pickup trucks and other vehicles. Also, more recently, considerable attention has been given to transporting bulk cargos such as dry bulk chemicals, powdered and pelletized resins, flour, coffee beans, and grains in large intermodal cargo containers.

Many procedures are well known and widely used for loading and unloading bulk cargos into and out of cargo containers. Nevertheless, it is believed that these procedures may be improved. For example, in many cases it is difficult to pack a bulk cargo tightly in a vehicle or container, and, as a result, the cargo is packed relatively loosely, or at a relatively low density, in the container. Because of this, the container is not filled with the maximum amount of cargo that the container could be used to carry.

In addition, in many instances, unloading a bulk cargo from a vehicle or container is a difficult and time-consuming task. For example, many cargo containers are tilted to slide a bulk cargo out of the container under the force of gravity. However, many bulk cargos, such as flour, starch, and cement, do not easily or completely flow out of tilted containers under the influence of gravity alone, and often it is necessary for an individual to help force the cargo out of the containers—for example, by sweeping, agitating with vibrators, or shoveling the cargo outward.

OBJECTS OF THE INVENTION

An object of this invention is to provide an air permeable pad that may be installed in a cargo container to help load cargo into the container and/or to help unload cargo from the container.

Another object of this invention is to improve methods for loading bulk cargo into cargo containers and to improve methods for discharging bulk cargo from cargo containers.

A further object of this invention is to aerate a bulk cargo as it is being discharged from a cargo container to facilitate unloading the cargo therefrom.

Still another object of this invention is to draw air from a bulk cargo loaded into a cargo container to compact the bulk cargo therein.

A further object of this invention is to provide an improved liner for lining the interior of a bulk cargo container that includes one or more air permeable pads that may be used either, or both, to draw air from a bulk cargo to help compact the cargo inside the cargo container or to conduct air into the bulk cargo to agitate that cargo as it is being unloaded from the container.

Another object of this invention is to utilize a liner—of the type that is used to cover the floor of a cargo container and that is pulled outward therefrom to pull a bulk cargo out from the cargo container—to draw air from the bulk cargo and thereby to help load the bulk cargo into the cargo container and/or to conduct air into the bulk cargo and thereby to help unload the bulk cargo from the cargo container.

SUMMARY OF THE INVENTION

These and other objects of the invention are achieved with an air permeable pad to help load a bulk cargo into and/or to help unload a bulk cargo from a cargo container. The air permeable pad comprises a body and a hose. The body, in turn, comprises a first, gas permeable layer and a second layer, and the two layers of the body are connected together and form an interior and a seal extending around that interior. The hose is connected to the body of the pad in communication with the interior thereof to conduct gas into or out from that interior.

In use, one or more of these pads is installed in or on a cargo container or vehicle to help load a bulk cargo into the container and/or to help unload a bulk cargo from the container. To help load cargo into a container, one or more of these pads is installed on or in a cargo container, in communication with the cargo area thereof, and, as a bulk cargo is loaded thereinto, air is drawn from that cargo, via the air permeable pads and associated hoses, to compact the cargo therein. This reduces the volume of space occupied by a given mass of the bulk cargo, allowing more cargo to be loaded into a given cargo area. To help unload cargo from a container, air is conducted into the bulk cargo via one or more air permeable pads to aerate and agitate the cargo therein. For example, if the container is tilted to slide the cargo out of the container, agitating the cargo in the container helps ensure that the cargo flows smoothly out the tilted container.

In accordance with another embodiment of this invention, a floor liner of a bulk cargo container is modified so that the entire liner may be used to draw air from and/or to conduct air into a bulk cargo in the container-to help load and/or unload the bulk cargo into or from the container. To elaborate, the floor of a bulk cargo container may be covered with an expandable liner that is pulled out from the container to pull the bulk cargo out therefrom. In accordance with this embodiment of this invention, such a liner is made of a first, gas permeable layer and a second layer that is connected to the first layer to form a liner interior. A hose is connected to the liner, in communication with the interior thereof, to conduct air into and/or out from the liner interior and the cargo in the cargo container.

With this liner, as with the above-discussed air permeable pads, to help load a bulk cargo in the cargo container, air is drawn from the cargo via the liner, compacting the cargo therein. To help unload a bulk cargo from the container, air is conducted into the cargo via the liner to aerate and agitate that cargo.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 12 shows the cargo being discharged from the cargo container of FIGS. 10 and 11.

FIG. 13 is a perspective view of the liner of the container shown in FIGS. 10–12.

FIG. 14 is an enlarged view of a portion of the liner shown in FIG. 13.

DETAILED DESCRIPTION OF THE PREFERRED EMBODIMENTS

Figure 1:
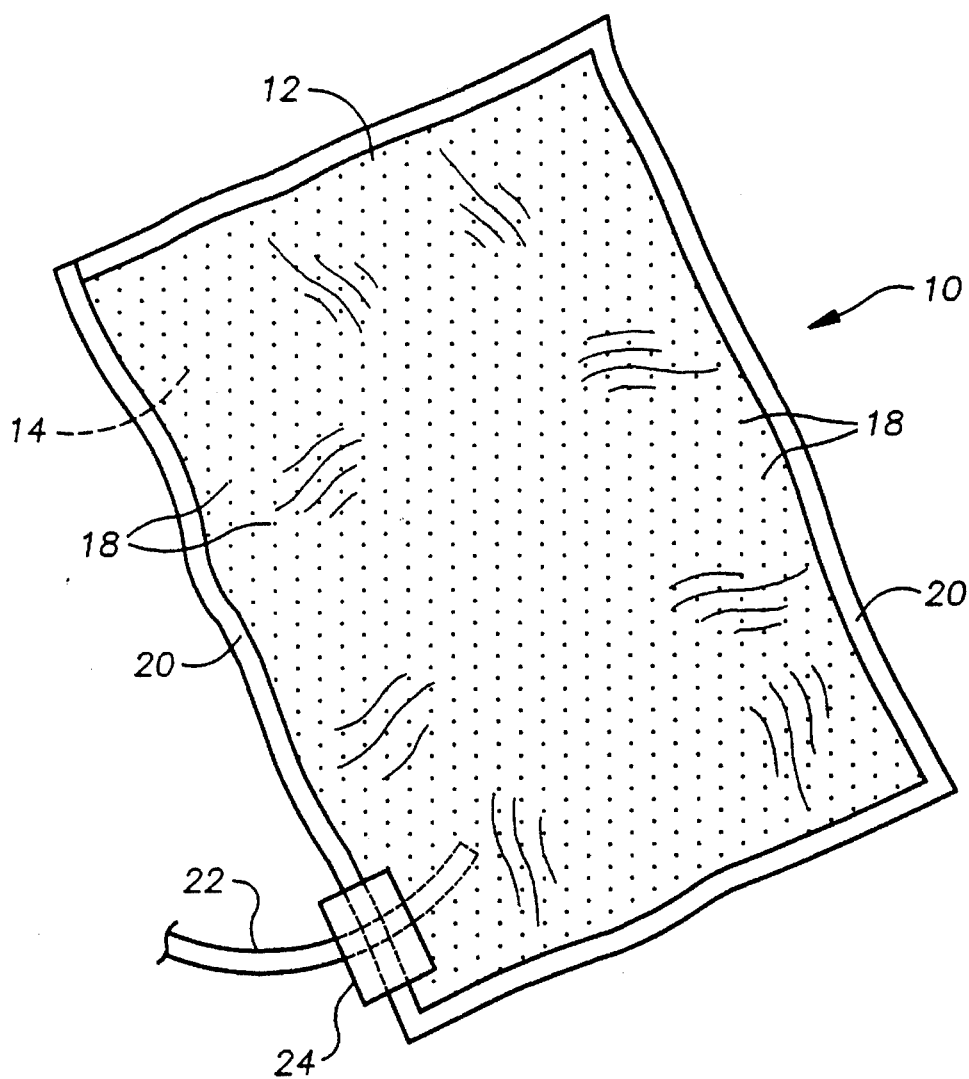
FIG. 1 is a perspective view of an air permeable pad in accordance with the present invention.
Figure 2:
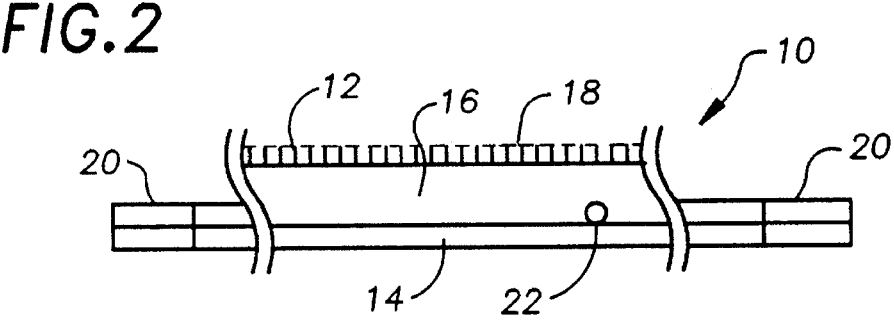
FIG. 2 is a cross-sectional view illustrating details of the air permeable pad of FIG. 1.

With reference to FIGS. 1 and 2, an air permeable pad 10 includes a first, gas permeable layer 12 and a second layer 14, which may be gas permeable or impermeable, and these two layers are connected together so that they form an interior 16 and a seal 20 extending completely around the interior 16. The seal 20 prevents or inhibits gas from escaping outward from the interior 16 of the pad 10 through the interface between the layers 12 and 14 thereof. These two layers 12 and 14 may be connected together in any suitable manner. For instance, a heat sealing procedure may be used to connect the layers together and to form the seal 20. Moreover, preferably, the first layer 12 of the pad 10 includes a multitude of perforations or pores 18 that allow gas to pass outward and inward through that first layer and from or into the interior 16 of the air permeable pad 10.

The layers of the pad 10 may be made from any suitable material. For example, the first layer 12 of the pad 10 may be made of a perforated plastic, canvas, or foil, or this layer may be made from a woven fabric, paper, or cloth, or the layer may be made of a metal mesh screening material. One suitable material for the perforated layer 12 of the pad 10 is sold under the trademark Valeron by Van Leer B. V., The Netherlands. The second layer 14 of the pad 10 may be made of any of the materials from which the first layer 12 is made, or the second layer 14 may be made of a gas impermeable material such as a solid plastic material or any other suitable material that is permeable or impermeable to the gas with which the pad is used and at the pressure at which that gas is used.

With the preferred embodiment of the pad 10 shown in FIGS. 1 and 2, an end 22a of a hose 22 extends into and is in communication with the interior 16 of the pad 10 to conduct gas thereinto or therefrom. Preferably, the outlet end of the hose 22 is sandwiched between the layers 12 and 14 of the pad 10, and the permeable pad 10 is connected to the hose 22 so as to form a seal therebetween to inhibit or prevent the gas from escaping through the connection between the hose 22 and the pad 10. For instance, a piece of adhesive tape 24 may be used to connect the hose 22 to the pad 10 and to form a suitable seal between the hose 22 and the pad 10. Alternatively, a suitable connection may be formed between the hose 22 and the pad 10 by a heat or sonic sealing procedure or by a flange fitting valve.

In use, one or more of the pads 10 is installed in or on a cargo container or vehicle to help load bulk cargo into the container and/or to help unload bulk cargo from the container. More specifically, to help load cargo into a container, one or more of the pads 10 is installed on or in a cargo container, in communication with the cargo area thereof, and, as bulk cargo is loaded thereinto, air is drawn from the bulk cargo, via the air permeable pads 10 and the associated hoses 22, to compact the cargo therein. This reduces the volume of space occupied by a given mass of cargo, allowing more cargo to be loaded into a given cargo area. To help unload cargo from a container, air or another gas is conducted into that bulk cargo via one or more of the air permeable pads 10 to aerate and agitate the cargo therein. For example, if the container is tilted to slide the cargo out of the container, aerating and agitating the cargo in the container helps ensure that the cargo flows smoothly out the tilted container.

Figure 3:
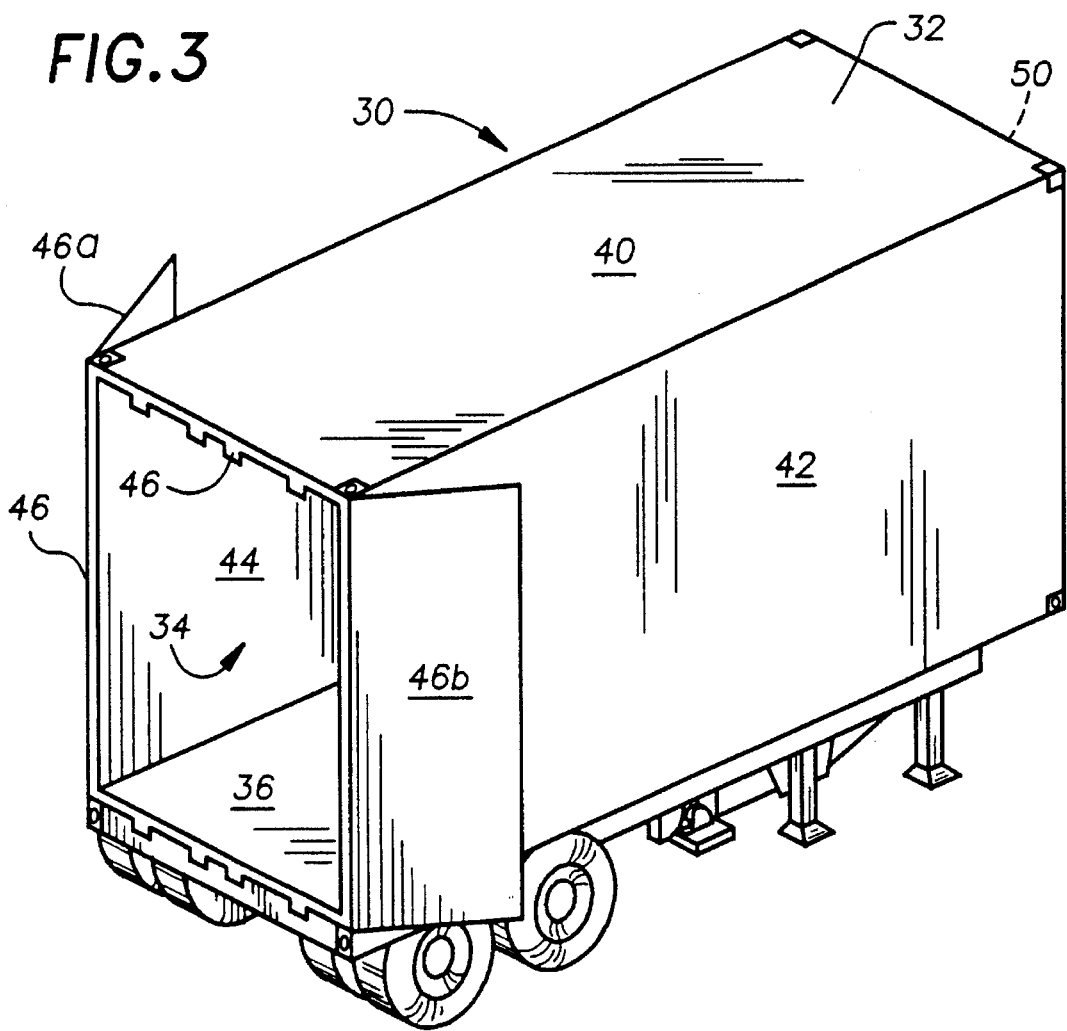
FIG. 3 is a perspective view of one type of cargo container with which the pad of FIG. 1 may be used.
Figure 4:
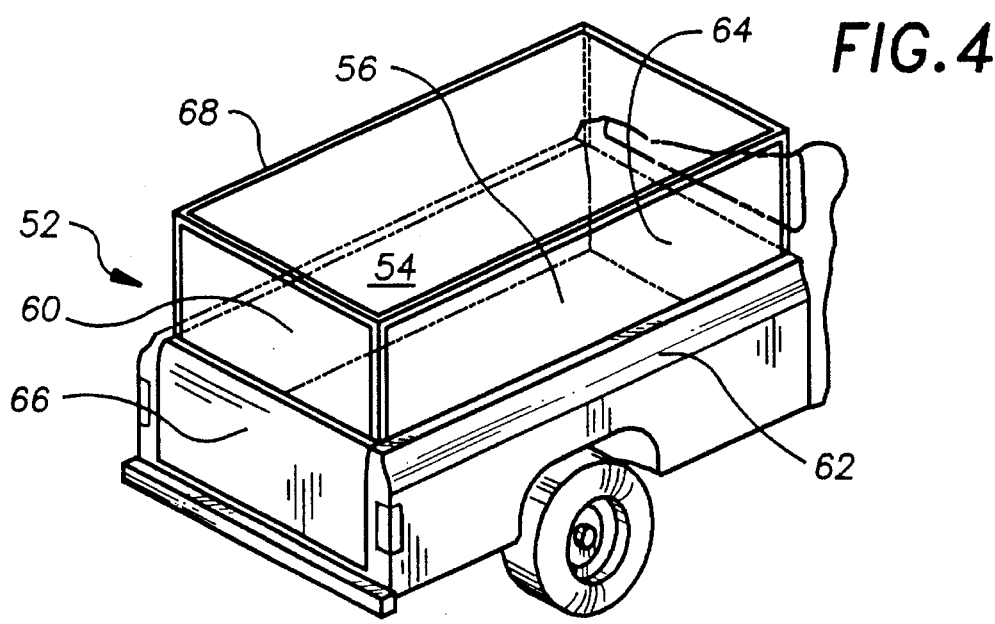
FIG. 4 is a perspective view of another type of cargo container with which the air permeable pad may also be used.

The pad 10, or a plurality of such pads, may be used with virtually any type of bulk cargo container, regardless of the specific size or shape of the container. For example, FIGS. 3 and 4 show two types of cargo containers which the pads 10 may be used to help load cargo into and/or which the pads 10 may be used to help discharge cargo from. More specifically, FIG. 3 shows a box-shaped intermodal cargo container 30. The container 30 has a conventional size and shape. In particular, it includes a container body 32 defining an interior cargo space 34 and having a floor 36, a roof 40, left and right side walls 42 and 44, and back and front walls 46 and 50. The back wall 46 includes a pair of outwardly hinged doors 46a and 46b that provide access to the interior cargo space 34 of the container 30. One or more pads 10 may be secured at any suitable location or locations inside the cargo container 30 in communication with the interior cargo space 34 thereof to help load cargo into and to help discharge cargo from the cargo container 30 in the manner discussed above. For instance, a multitude of pads 10 may be secured to the floor 36 of the cargo container 30, to one or both of the side walls 42, 44 of the container 30, to the roof 40 or the floor 36 of the cargo container 30, or to the front wall 50 or the back wall 46 of the container 30.

FIG. 4 shows a portion of a conventional pickup truck 52 having a cargo space or bed 54 formed by a floor 56, a pair of side walls 60 and 62, a front wall 64, and a pivotal back wall or tailgate 66. The pickup truck 52 may be provided with a closed cab 68. One or more pads 10 may be installed at any suitable location or locations on the pickup truck 52 to help load cargo into it and to help unload cargo from it (specifically, from the cargo space 54) in the manner discussed above. For example, a multitude of pads 10 may be secured to the floor 56 of the cargo space 54, to the side walls 60, 62, or to the front or back walls 64, 66 to conduct air into and/or out from cargo loaded into the truck bed 54.

Figure 5:
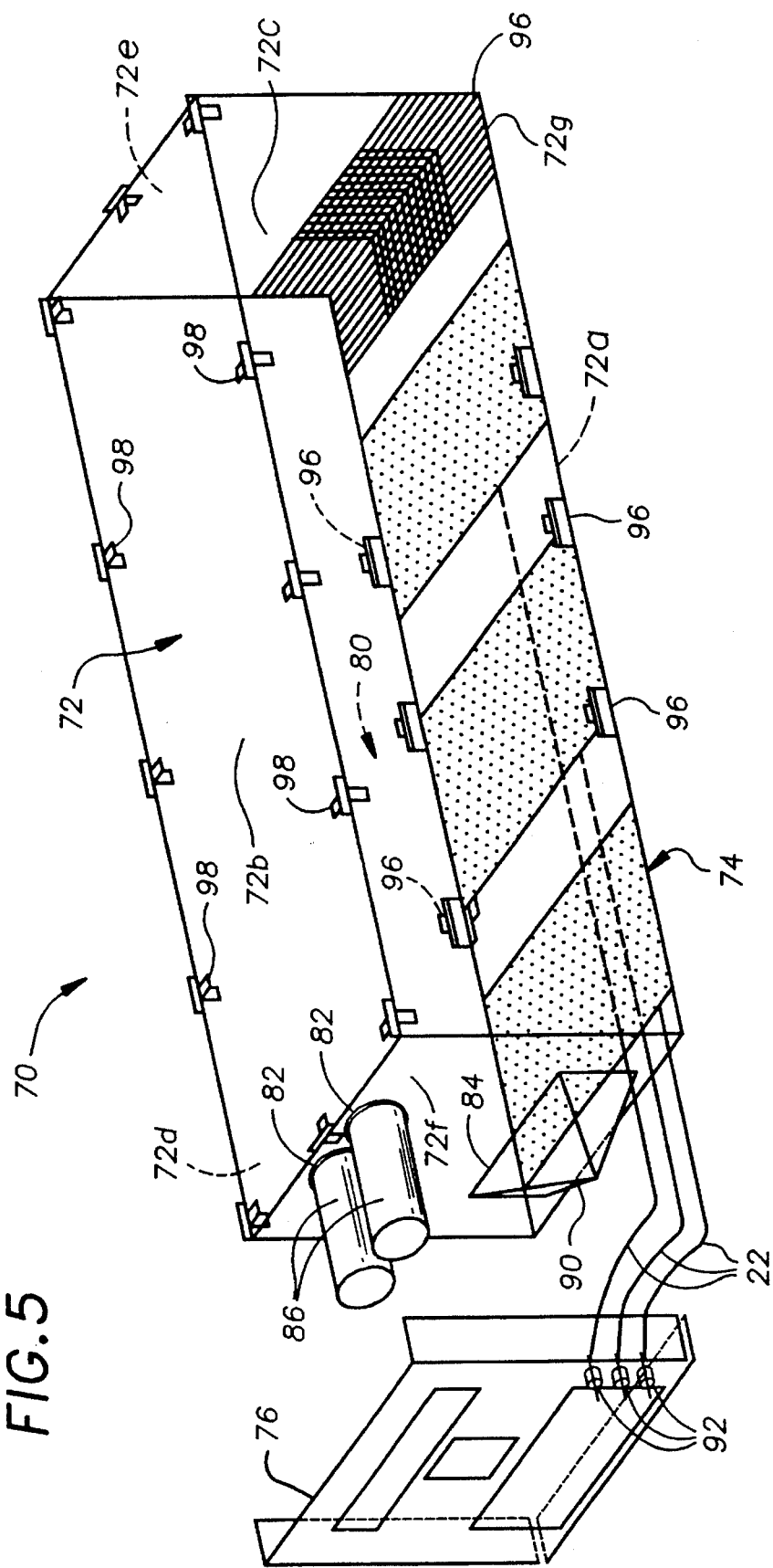
FIG. 5 is an orthogonal view of a container liner provided with a plurality of the air permeable pads of the type shown in FIG. 1.

Cargo containers of the type shown in FIG. 3 may be lined with an inflatable, expandable liner of the type shown at 70 in FIG. 5. The liner 70 protects bulk cargo carried by the container from contamination and from undesirable exposure to the natural elements. After the cargo is unloaded from the container, the liner 70 can be removed so that the container is again usable, without significant cleaning, to carry other cargo. As also shown in FIG. 5, one or more pads 10 may be secured to such a liner 70 and inserted with the liner 70 into a cargo container to help load cargo into and/or discharge cargo from the container.

With reference to FIG. 5, the liner 70 comprises an expandable and flexible liner body 72 and an air system 74, and preferably the liner 70 also includes a bulkhead 76. The air system 74, in turn, includes at least one air pad 10 and at least one hose 22, and preferably the air system 74 includes a plurality of such pads and hoses. Generally, the liner body 72 defines or forms an interior 80 for holding a bulk cargo, and the liner body 72 defines at least one inlet 82 for conducting bulk cargo into the liner interior and at least one outlet 84 for discharging bulk cargo therefrom. The air system 74 is in communication with the interior 80 of the liner body 72 and is provided for drawing air from bulk cargo loaded therein to help compact that cargo and/or for conducting gas from a source thereof and into the interior 80 of the liner body 72 to help discharge the bulk cargo therefrom.

More specifically, each hose 22 extends from a position outside the liner body 72 to a position inside the liner body 72, and each air pad 10 is disposed inside the liner body 72 and is connected to one or more of the hoses 22. To help compact a bulk cargo inside the liner body 72, the hoses 22 are connected to a low pressure source to draw air from the bulk cargo, via the pads 10. To help discharge a bulk cargo from the liner body 72, the hoses 22 are connected to a source of high pressure gas or a low-pressure high volume gas; the hoses 22 conduct that gas to the air pads 10; and each air pad 10 receives gas from one or more of the hoses 22, distributes the gas over a given area, and then discharges the gas into the interior 80 of the liner body 72. Also, solid plastic pipe may be used as the hoses 22.

The liner body 72 is flexible and expandable and, as shown in FIG. 5, the liner body 72 includes bottom and top panels 72a and 72b, right and left panels 72c and 72d, and front and back panels 72e and 72f, which are connected together to form the liner body 72. The liner body 72 also preferably includes a reinforcing panel 72g. As previously mentioned, the liner body 72 is employed to line the interior of a cargo container, and, when the liner body 72 is inflated or expanded inside the cargo container, the shape of the liner body 72 partially or substantially conforms to the shape formed by the interior surfaces of that container. It should be noted, however, that the present invention may be practiced with liners 70 that only partially conform to the shape of the interior of the cargo container with which the liner 70 is used. For example, many liners are only half the height of the cargo container with which they are used. As illustrated in FIG. 5, the liner body 72 has a hollow, substantially parallelepiped shape, although the liner body 72 may be provided with other shapes. Also, the pads 10 can be used with no liner.

The liner body 72, specifically the back panel 72f thereof, includes the inlets 82 and the outlet 84 to conduct cargo into and out of the interior 80 of the liner body 72. Chutes 86 and 90 may be connected to the back panel 72f, adjacent the inlets 82 and the outlet 84, respectively, to facilitate loading cargo into and unloading cargo from the liner body 72. The chutes 86 and 90 may be tied closed, as desired, to cover and close the inlets 82 and the outlet 84.

The liner body 72 may be made in any suitable manner and from any suitable material. For example, the liner body 72 may be made from a thin plastic material such as polyethylene having a thickness of seven mils. The liner body 72 may be formed from one large sheet of plastic material and folded into the desired shape. Alternatively, the panels 72a–e may be formed from one large sheet of material and folded into the desired shape, with the back panel 72f subsequently connected to the other liner body panels to form the complete liner body 72. As still another example, each panel of the liner body 72 may be formed separately, and the panels may be connected together to form the desired liner body 72. Any suitable technique may be employed to make any necessary connections between the panels 72a–e of the liner body 72. For instance, the liner body panels may be heat or ultrasonically sealed together, or sewn or glued together.

Also, the liner body 72 may be made from a blown polyethylene extruded tubular film, for instance having a thirty-two foot circumference. When the liner body 72 is made from such a tubular film, it is not necessary to heat seal any side panels together to form a tubular body, thus eliminating the need for any longitudinal seams on the liner body. For example, a twenty-foot liner body 72 may be made from a tubular film having a circumference of thirty-two feet and a length of twenty-eight feet, with the extra eight feet of length of the film being used to form the end walls or panels of the liner body 72.

Figure 6:
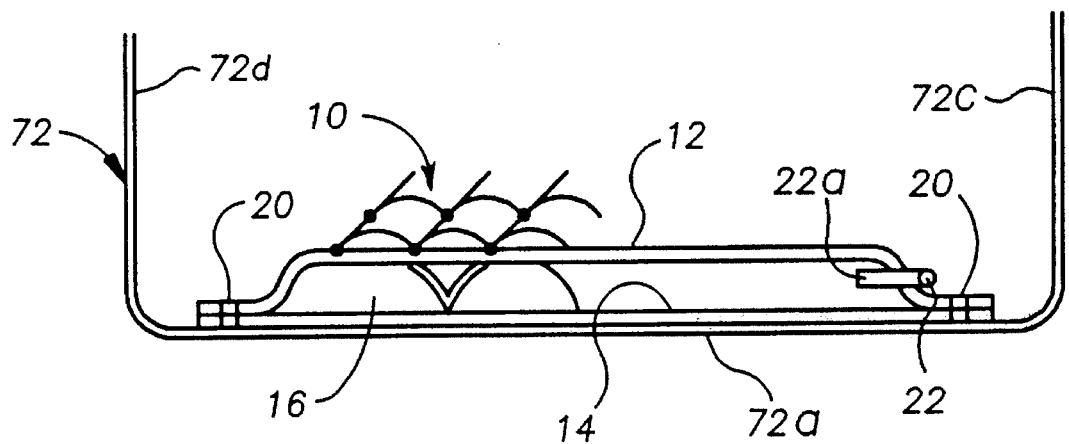
FIG. 6 is a cross-sectional view illustrating details of the liner of FIG. 5.

With reference to FIGS. 5 and 6, the pads 10 are preferably mounted inside the liner body 72, with the second layer 14 of each pad 10 placed directly against the liner body 72 and with the first layer 12 of each pad 10 facing the interior 80 of the liner body 72. Also, the pads 10 are preferably connected to the liner body 72 by an adhesive or an adhesive tape—although other suitable means, such as a heat or sonic sealing process, may be used to connect the air pad 10 to the liner body 72.

Preferably, the pads 10 are secured to the liner body 72 before all the panels thereof are connected together to enclose, or to substantially enclose, the interior 80 thereof, or before the end of the blown polyethylene extruded tubular film is heat sealed. In addition, the hoses 22 preferably extend inside the liner body 72, rearward from the pads 10, and all the hoses 22 extend through a common opening in the back panel 72f of the liner body 72. Alternatively, the hoses 22 may extend outside the liner body 72. In use, the bulkhead 76 is held against the back panel 72f of the liner body 72, and the hoses 22 also extend through the bulkhead 76. Preferably, the bulkhead 76 includes one or more openings 92 specifically provided to allow the hoses 22 to pass through the bulkhead 76. Alternatively, though, the hoses 22 may be passed through inlets or an outlet in the bulkhead 76 that correspond to the inlets 82 and the outlet 84 in the back panel 72f of the liner body 72, may be passed over the bulkhead 76, or may be used without the bulkhead 76.

Figure 7:
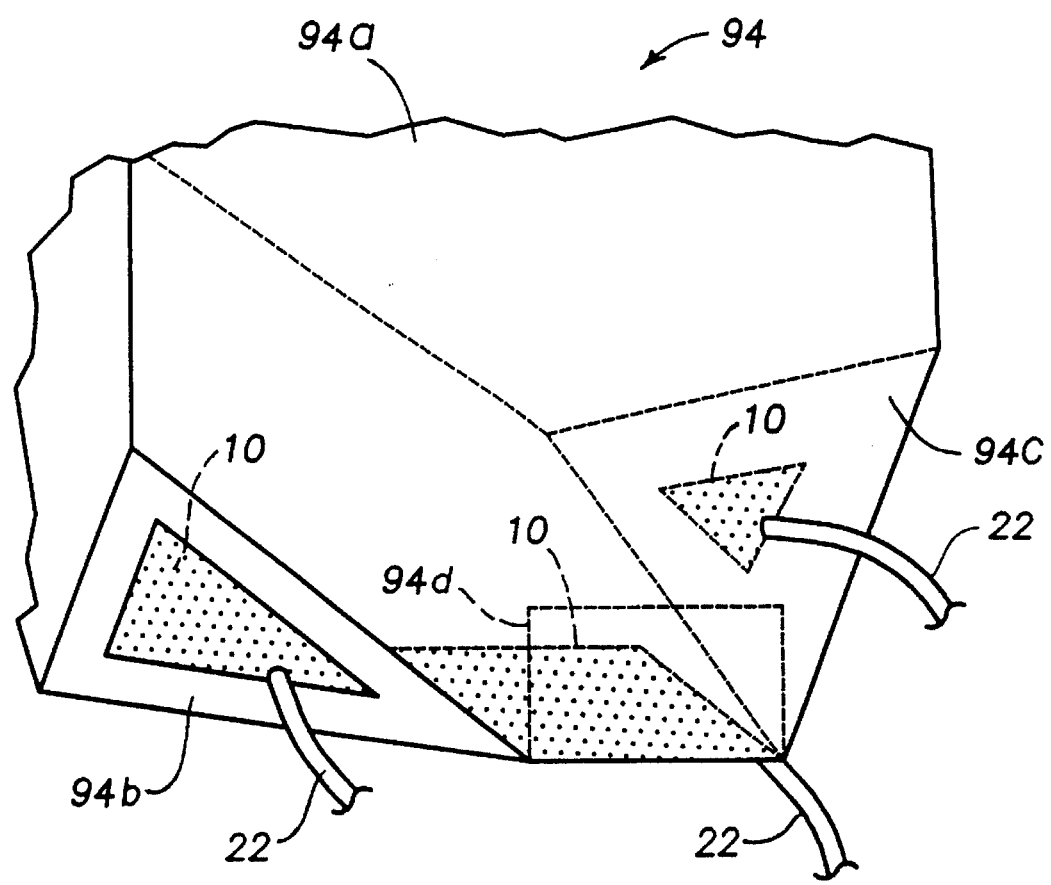
FIG. 7 is a perspective view of a portion of another liner that may also embody the present invention.

As shown in FIG. 5, the liner 70 is provided with three air pads 10, connected to and spaced apart along the bottom panel 72a of the liner body 72, and each of these air pads transversely extends completely or substantially completely across the bottom panel 72a of the liner 70. It should be noted that the liner 70 may be provided with more or fewer air pads 10, and the air pads 10 may be located at any position inside the liner body 72. For example, one or more air pads 10 may be secured to the front panel 72c, the back panel 72f, one or both of the side panels 72c, 72d, or the top panel 72b of the liner body 72. In particular, with reference to FIG. 7, in an alternate type of liner body 94, the back panel 94a of the liner body 94 has slanted discharge angles in the lower corner portions 94b and 94c, and air pads 10 may be secured to those lower corner portions and to the area of the liner body 94 immediately adjacent the discharge outlet 94d thereof. Preferably, a hose 22 is connected to each pad 10 to conduct gas into or from that pad.

Figure 8:
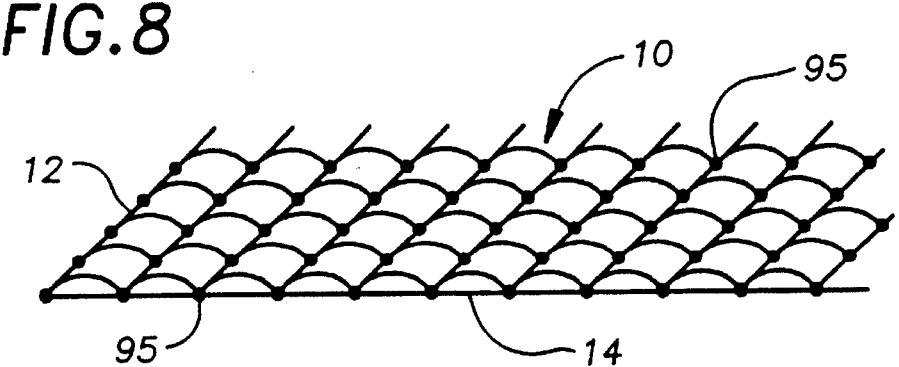
FIG. 8 is a perspective view showing a modification of the aeration pad of FIGS. 1 and 2.
Figure 9:
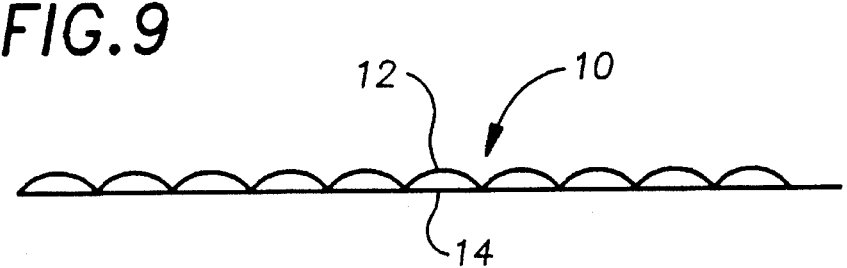
FIG. 9 is a cross-sectional view illustrating details of the aeration pad of FIG. 6.

With reference to FIGS. 8 and 9, air pads 10 may be provided with multiple heat seals 95 to prevent the air pads from inflating to pillow shaped forms. Such pillow shaped forms are undesirable because they may prevent or inhibit product from sliding down when a container is tilted to discharge the product.

With reference again to FIG. 5, the reinforcing panel 72g is secured to the bottom panel 72a of the liner body 72 to reinforce that latter panel, and preferably the reinforcing panel 72g extends under and is connected to the bottom surface of the bottom panel 72a. The reinforcing panel 72g extends rearward from, or from a position adjacent, the front edge of the liner 70. The reinforcing panel 72g may also be secured to the bottom portion of the front panel 72e of the liner body 72 to reinforce this area of the liner body, and preferably the reinforcing panel 72g extends upwardly approximately 25% of the height of the front panel 72e. The reinforcing panel 72g may extend over more or less of the bottom panel 72a and the front panel 72e than is shown in FIG. 5. If desired, the reinforcing panel 72g may completely cover the front panel 72e and the bottom panel 72a.

The reinforcing panel 72g also may be made from any suitable material and in any suitable manner, and it may be connected to the liner body 72 in any acceptable way. Preferably, in the liner body 72, the reinforcing panel 72g has a high resistance to stretching at least along the length of the liner body 72. For example, the reinforcing panel 72g may be constructed of woven polyethylene or polypropylene fabric having a weight of about 3.30 oz./sq.ft. Alternatively, the reinforcing panel 72g could be made from strips, such as two inch strips, of fiberglass tape, metal reinforced tape, or polyester reinforced tape, or the reinforcing panel 72g could be made from co-extruded cross-laminated plastic film or co-extruded or cross-laminated plastic film.

The use of the reinforcing panel 72g is not necessary to the practice of the present invention in its broadest sense, and it may be possible to provide the liner body 72 with the desired longitudinal strength by forming the whole liner body 72 from a high strength material that would provide the desired resistance to stretching. Multiple spot sealing may also be used to provide the liner body 72 with the desired longitudinal strength. Using the reinforcing panel 72g is preferred, however, because this is a very simple, economical, and effective way to provide the liner body 72—with the desired longitudinal strength.

With reference to FIGS. 1, 3, and 5, to install the liner 70 inside the cargo container 30, the liner body 72 is placed inside the container 30, with the bottom panel 72a of the liner body 72 on or over the floor 36 and with the left and right bottom edges of the liner body 72 adjacent the left and right bottom inside edges of the container 30. The liner body 72 may be in a collapsed, comparatively flat condition when it is placed in the container 30, with the top panel 72b of the liner body 72 lying closely over the bottom panel 72a and with the side panels 72c and 72d folded inwardly between the top and bottom panels 72b and 72a. The liner body 72 may be initially placed in the container 30 in a further folded or rolled condition, and it may then be unfolded or unrolled into the above-mentioned comparatively flat condition.

After the liner body 72 is unfolded or unrolled onto the floor 36 of the container 30, the bottom of the liner body 72 is connected to the floor 36. For example, the liner body 72 may be provided with a multitude of lower lashing members or connecting segments 96 positioned around the liner body 72 to help hold the liner body 72 inside the container body 32. In particular, the connecting segments 96 may be used to secure tightly the bottom panel 72a of the liner body 72 to the floor 36 of the container 30. Numerous other procedures are known for connecting a liner to the floor of a cargo container, and any suitable such procedure may be used with the liner 70. For instance, other connecting procedures are disclosed in copending patent applications Ser. Nos. 482,030, 627,695, and 758,766 filed Feb. 15, 1990, Dec. 14, 1990, and Sept. 12, 1991, respectively. Alternatively, it might not be necessary to fasten the liner body 72 directly to the floor 36 of the cargo container 30.

Once the bottom of the liner body 72 is secured in the container 30, the liner body 72 is partially inflated therein. This may be done by conducting a gas into the interior of the liner body 72 via the inlet 82. After the liner body 72 is partially or fully expanded inside the cargo container 30, the liner body 72 is connected either to the roof 40 or to upper portions of the side walls 42, 44 of the cargo container 30. This also may be done in any acceptable manner, and numerous procedures are known for doing this. For instance, suitable connecting procedures are disclosed in the abovementioned copending applications Ser. Nos. 482,030, 627, 695, and 758,766. With the liner body 72 illustrated in FIG. 5, the liner body 72 is provided with a multitude of upper lashing members 98, spaced around the upper periphery of the liner body 72, to connect the liner body 72 to the roof 40 or upper portions of the side walls 42, 44 of the cargo container 30.

After the liner body 72 is fully secured in the cargo container 30, the liner body 72 is then fully expanded therein. Generally, in the inflated or expanded position of the liner 70, the bottom panel 72a extends over the floor 36 of the container 30, the left and right side panels 72c and 72d of the liner body 72 respectively extend over the left and right side walls 42 and 44 of the container 30, and the front panel 72e of the liner body 72 extends over the front wall 50 of the container 30. After the liner body 72 is secured inside the cargo container 30, the bulkhead 76 is preferably held or positioned against the back panel 72f of the liner body 72 to help hold or support the liner body 72 inside the cargo container 30.

Once the liner 70 is fully secured inside the cargo container 30, cargo may be loaded into the container 30 via the inlets 82. To help compact the cargo, the hoses 22 are connected to a low pressure source to draw air from the cargo via the pads 10. After the desired quantity of cargo is loaded into the container 30, the cargo is transported in the cargo container 30 to a selected destination. Then, the cargo is unloaded from the cargo container 30. To do this, the outlet 84 of the liner 70 is opened, and the cargo container 30 is tilted to slide the cargo out through the outlet 84. At the same time, gas is conducted through the air system 74 and into the interior 80 of the liner 70 to help force that cargo outward through the outlet 84 and, in particular, to agitate that bulk cargo and thereby to help to insure that the bulk cargo flows smoothly out the container 30. By firmly securing the liner body 72 inside the cargo container 30, the liner body 72 is able to withstand the turbulence created by the air system 74.

More specifically, the hoses 22 are connected to a pressurized gas source, not shown, which may supply pressurized air or nitrogen, for example, and each of the hoses 22 is connected to a respective one of the air pads 10. Pressurized air is conducted into the liner body 72 through the hoses 22 and the pads 10, while gas and product is withdrawn from the liner body 72 through the outlet 84. Preferably, during at least most of the time during which cargo is discharged from the liner body 72, the pressure inside the liner body 72 is maintained slightly above the ambient atmospheric pressure. The air pressure inside the liner 70 is preferably high enough to keep the liner 70 inflated inside the container 30, but this pressure should not be allowed to increase to a level where it might damage the cargo container 30. Pressure sensors, not shown, may be located inside the container 30 or the liner 70 and connected to the pressurized gas source to sense the pressure inside the liner 70 and to deactivate the pressurized gas source to stop the flow of gas into the liner 70 when the pressure therein rises above a given level.

A closed loop system may also be used with the liner 70. Such a system may have a compression mode and an aeration mode. In the compression mode, which is similar to known vacuum packing procedures, air is drawn out from the bulk cargo via the pads 10 and the hoses 22, and all other outlets and inlets of the liner 70 are closed. Similar procedures are used to vacuum pack products such as coffee. In the aeration mode, air is conducted into the bulk cargo via the pads 10 and the hoses 22, and the outlet 84 of the liner 70 is opened to expel the air from the interior of the liner 70. Filters may be used to filter the air being discharged or expelled from the liner.

As previously mentioned, the floors of bulk cargo containers may be covered with expandable liners that are pulled out from the containers to pull the bulk cargos out therefrom. The present invention may also be embodied in such floor liners or conveyor sheets. FIGS. 10–15 illustrate such a floor liner and a cargo container having such a floor liner.

Figure 10:
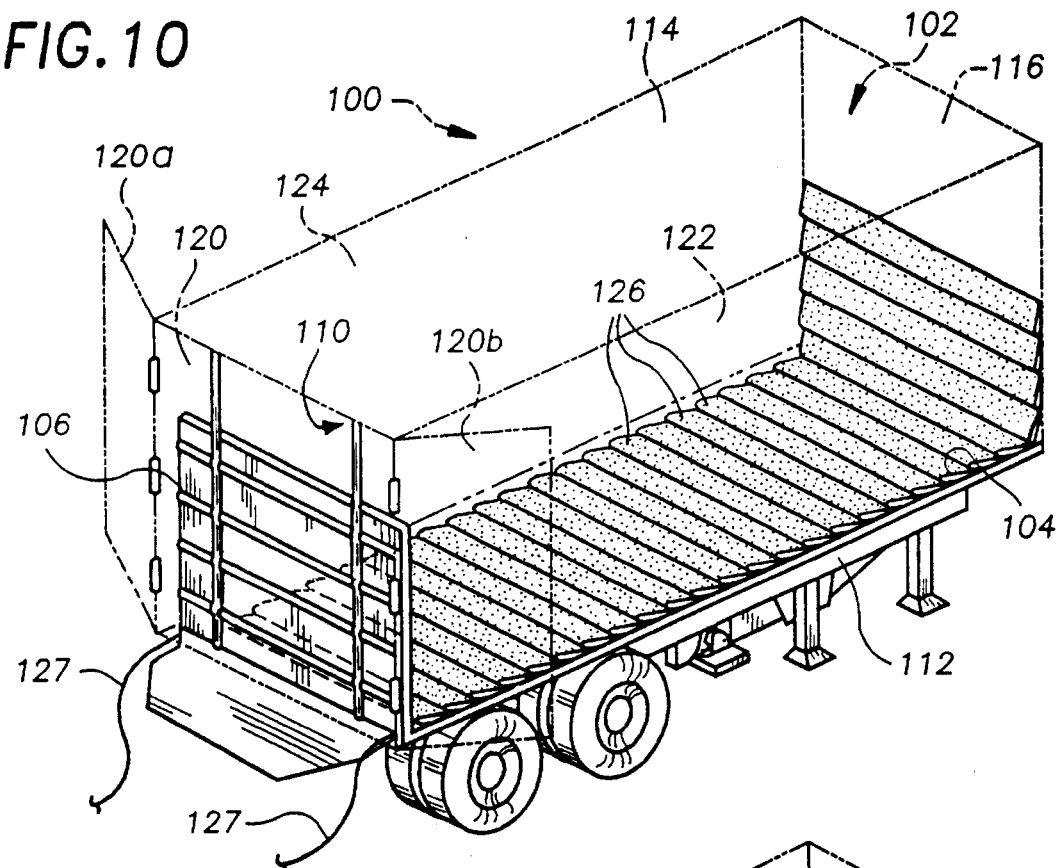
FIG. 10 shows a bulk cargo container having another liner embodying the present invention.
Figure 11:
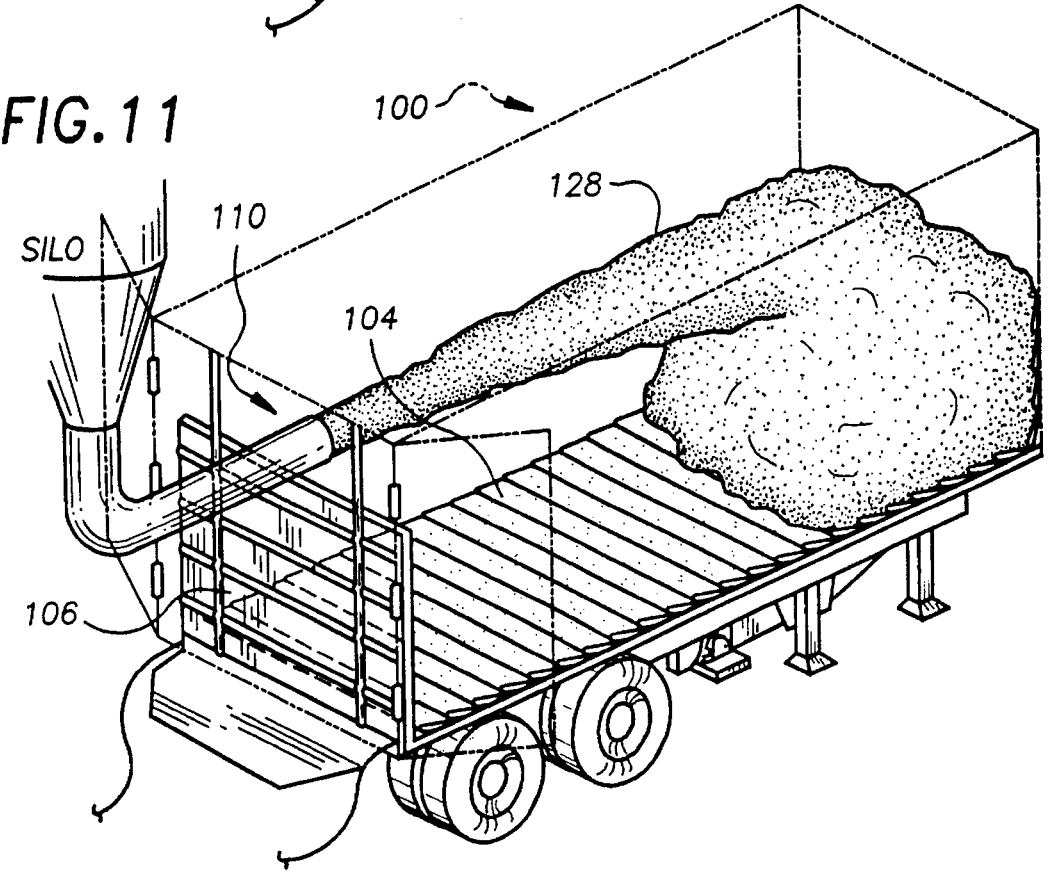
FIG. 11 illustrates a cargo being loaded into the container of FIG. 10.

More specifically, FIGS. 10–12 illustrate a cargo container 100 generally comprising a container body 102, a liner 104, and a bulkhead 106. Generally, the container body 102 defines an interior cargo space 110 for holding a cargo, and the container body 102 includes a floor 112, a roof 114, front and back walls 116 and 120, and right and left side walls 122 and 124. The back wall 120 includes a pair of outwardly hinged doors 120a and 120b, and, when these doors are open, the back wall 120 forms an opening that provides access to the interior of the cargo container 100. The liner 104 is positioned on the floor 112 of the container 100 in a sequence of overlapping pleats or folded sections 126 that allow the length of the liner 104 to expand. The bulkhead 106 is secured inside the container body 102, immediately forward of the back wall 120, to hold a cargo in the cargo space 110.

The liner 104 is made of a first, gas permeable layer and a second layer that is connected to the first layer to form a liner interior. One or more hoses 127 are connected to the liner 104, in communication with the interior thereof, to conduct air into and/or out from the liner interior and cargo in the cargo space 110. For example, the first layer of the liner 104 may be made of a perforate plastic, canvas, or foil, or this layer may be made from a woven fabric, paper, or cloth. The second layer of the liner 104 may be made of any of the materials from which the first layer may be made, or the second layer may be made of a gas impermeable material such as a solid plastic material.

Generally, in operation, a bulk cargo 128 is loaded into the cargo space 110 and onto the liner 104. Suitable inlet openings (not shown) may be provided in the bulkhead 106 to allow the cargo to pass therethrough and into the cargo space 110, or the bulk cargo 128 may be conducted into the cargo space 110 through the area above the top of the bulkhead 106. During this loading operation, air is drawn from the bulk cargo 128, via the liner 104 and the hoses 127, to compact the bulk cargo 128 therein. Once the container 100 is loaded with the bulk cargo 128, it is transported, and the container 100 is unloaded after it reaches its destination.

To unload the bulk cargo 128 from the container 100, an opening 130 is formed in the bottom of the bulkhead 106, and the liner 104 is pulled outward from the cargo container 100. As the liner 104 is so pulled, the bulk cargo 128 is pulled out with the liner 104. At the same time, the pleats 126 of the liner 104 unfold, expanding the length of the liner 104. The dimensions of the liner 104, particularly the size and number of the pleats 126, are selected so that the liner 104 is able to pull out substantially all of the bulk cargo 128 from the cargo container 100 as the liner 104 itself is pulled out of the cargo container 100. Preferably, a mechanical apparatus is used to pull the liner 104 out from the cargo container 100. This mechanical apparatus may be mounted on the cargo container 100, or it may be a free standing unit positioned behind the back wall 120 of the cargo container 100. To help unload bulk cargo 128 from the cargo container 100, air or another gas is conducted into the bulk cargo 128 via the hoses 127 and the liner 104, to aerate and agitate the bulk cargo 128 therein.

FIGS. 13 and 14 illustrate the liner 104 in greater detail. With particular reference to FIG. 13, the liner 104 has a generally elongated, rectangular shape, including front and back edges 104a and 104b. Also, the folded sections 126a–126d of the liner 104 are spaced apart along the length of the liner 104, and each of the folded sections 126a–126d of the liner 104 extends completely across the width of the liner 104 substantially perpendicular to the longitudinal axis of the liner 104. The number and widths of the folded sections 126a–126d of the liner 104 are chosen to help ensure that the bulk cargo 128 is completely unloaded from the cargo container 100 as the liner 104 is pulled out therefrom. Preferably, the length of the liner 104 is at least equal to the length of the floor 112 of the container 100. Even more preferably, the length of the liner 104 is greater than the length of the floor 112 of the container 100. The front portion of the liner 104 may be provided with attachment means to help secure the liner 104 inside cargo container 100. Also, the back end portion of the liner 104 preferably has truncated corner portions to help pull the liner 104 out of the cargo container 100.

In addition, small connections, as shown at 132, are formed between adjacent folded sections 126a–126d to maintain those folded sections held against each other inside the cargo container 100 until the liner 104 is pulled out of the cargo container 100. Each connection 132 has very little resistance and is broken as soon as an appreciable pulling force is applied to the bottom of the two layers joined by the connection. The connections 132 may be made by a needle point seal weld. Adjacent folded sections 126a–126d may be suitably connected together in other ways, though. For instance, adjacent folded sections 126a–126d may be connected together by a hot melt procedure, by adhesive tape, by contact cement, by adhesive, or by Velcro®, or the folded sections 126a–126d may be hot ironed in place or stitched together.

Figure 15:
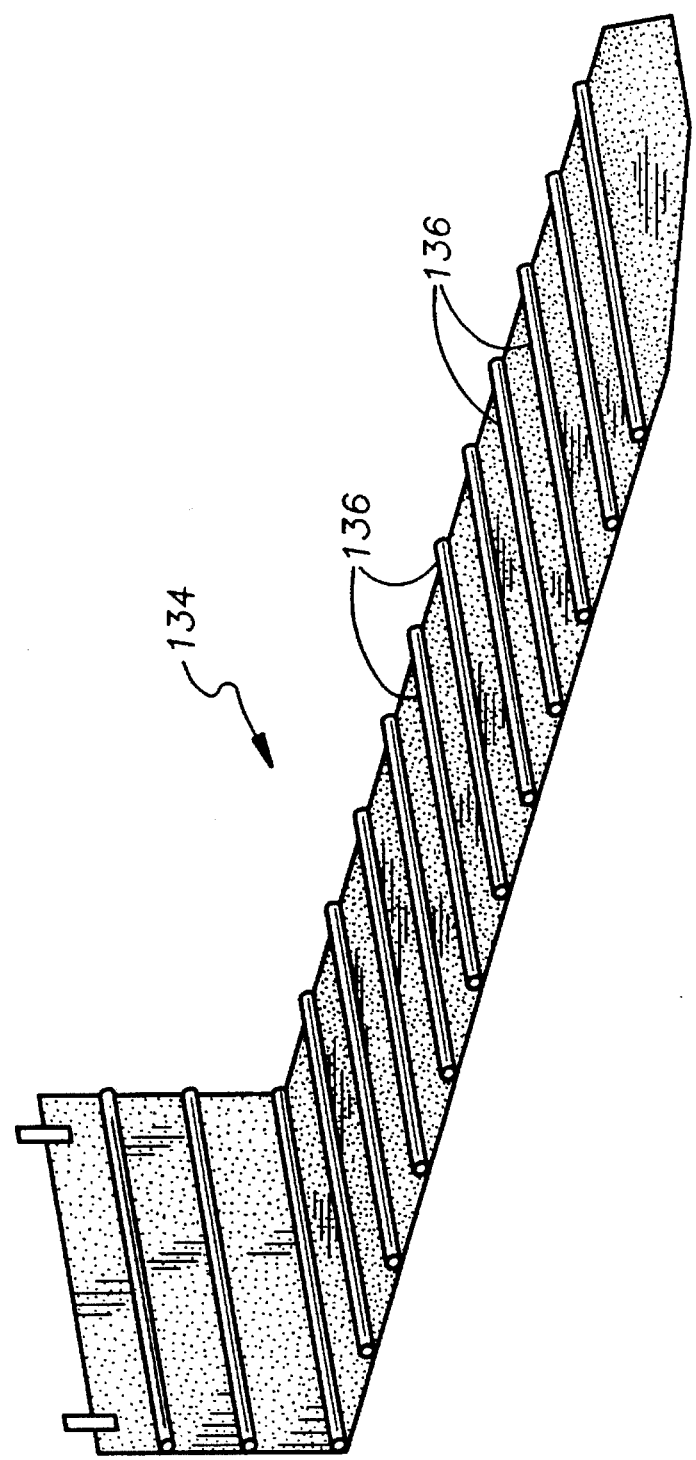
FIG. 15 is a perspective view of a further liner also embodying the present invention.

FIG. 15 illustrates an alternate liner 134 that may also be used to pull a bulk cargo from the cargo container 100. The liner 134 includes a multitude of rolled sections 136, rather than a multitude of overlapping pleats 126, spaced along the liner 134 to allow the length of the liner 134 to expand as it is pulled outward from the cargo container 100. The specific number of rolled sections 136 in the liner 134 and the size of each rolled section may vary, however, depending on the specific application for which a particular liner 134 is intended. Preferably, after each rolled section of the liner 134 is formed, means are applied to the formed roll to hold the material thereof in that roll. For instance, a needle or pin point seal weld may be used to connect together the layers of each roll. Alternatively, adhesive tape may be applied over each roll and connected to adjacent portions of the liner 134, on one or both sides of the roll, to prevent the roll from prematurely unravelling. The length of the liner 134 also is preferably at least equal to, and more preferably is greater than, the length of the floor 112 of the container 100.

Preferably the liners 104 and 134 are formed in a manner very similar to the manner in which the air pads 10 are formed. More specifically, each of these liners comprises a first, gas permeable layer and a second layer which may be gas permeable or impermeable, and the two layers of the liner are connected together so that they form an interior and a seal extending completely around the interior. These two layers of the liner may be connected together in any suitable manner, such as by a heat sealing procedure. Moreover, preferably the first layer of each pad 10 includes a multitude of perforations or pores that allow gas to pass outward and inward through that first layer and from or into the interior of the liner.

The individual layers of each of the liners 104 and 134 may be made from any suitable material. For example, the first layer of each liner may be made of a perforated plastic, canvas, or foil, or this layer may be made from a woven fabric, paper, or cloth, or the layer may be made of a metal mesh screening material. One suitable material for this perforated layer of the liner is the above-mentioned material sold under the trademark Valeron by Van Leer B. V., The Netherlands. The second layer of each liner may be made of any of the materials from which the first layer of the liner may be made, or this second layer may be made of a gas impermeable material such as a solid plastic material or any other suitable material that is permeable or impermeable to the gas with which the liner is used and at the pressure at which that gas is used.

Preferably an end of a hose extends into and is in communication with the interior of each liner 104, 134 to conduct gas thereinto or therefrom. Preferably, the outlet end of the hose is sandwiched between the two layers of the liner, and the liner is connected to the hose so as to form a seal therebetween to inhibit or prevent the gas from escaping through the connection between the hose and the liner. For instance, adhesive tape may be used to connect the hose to the liner and to form a suitable seal between that hose and the liner. Alternatively, a suitable connection may be formed between the hose and the liner by a heat or sonic sealing procedure or by a flange fitting valve.

In use, the liners 104 and 134 are installed on the floor of a cargo container. To help load cargo into the container, air is drawn from the bulk cargo, via the liner and the associated hose or hoses, to compact the cargo therein. This reduces the volume of space occupied by a given mass of cargo, allowing more cargo to be loaded into a given cargo area. To help unload cargo from a container, air or another gas is conducted into that bulk cargo via the liner as the liner itself is pulled out from the cargo container to pull the cargo out therefrom. The air or other gas conducted into the bulk cargo aerates and agitates that cargo, facilitating a complete and smooth discharge of the cargo from the container as the liner is pulled out therefrom.

The liners 104 and 134 may be used with virtually any type of bulk cargo container, regardless of the specific size or shape of the container. For example, these liners may be used with the cargo containers shown in FIGS. 3 and 4, as well as the container shown in FIG. 10.

The liners 104 and 134 may be used in conjunction with other liners—such as liners of the general type shown in FIG. 5—that line the interiors of cargo containers. U.S. Pat. No. 4,799,607 and U.S. patent application Ser. No. 481,989 disclose additional expandable container liners that are used to line the interiors of cargo containers to help keep the container surfaces clean and to help protect the cargo inside the container. After such a container liner has been installed inside a cargo container, the liner 104 or the liner 134 may be installed inside the former liner, over the floor of the cargo container, to subsequently discharge product from the lined cargo container.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method for loading a bulk cargo into a cargo space of a cargo container, said method comprising disposing a flexible liner within the cargo space and attaching the liner to the cargo container at a plurality of locations on both bottom and top surfaces of the container so that the liner generally conforms to the shape of the cargo container, and placing at least one air pad having at least one air permeable side within the liner on a bottom surface thereof, and drawing gas from within the cargo space and liner by connecting the at least one air pad to a suction source simultaneously with loading of the bulk cargo and continuously throughout the loading of the bulk material to draw the bulk cargo to the bottom of the cargo space and liner so as to compact the bulk cargo in the cargo space.

2. The method as in claim 1, wherein said step of placing at least one air pad includes fixing the at least one air pad onto the floor of the liner.

3. The method as in claim 1, wherein said step of connecting the at least one air pad to a suction source includes connecting each air pad to a negative pressure source with a hose, the hose being in communication with an interior space of each air pad.

4. The method as in claim 1, wherein said step of placing at least one air pad comprises disposing a plurality of the air pads within the liner to essentially cover the bottom of the liner.

5. The method as in claim 4, further comprising adhering the plurality of the air pads to the liner.

6. A method for loading a flowable bulk cargo into a cargo space of a cargo container, comprising:

positioning an expandable pliable liner within the cargo space, the liner having at least one air pad secured thereto on a bottom surface thereof, each air pad having at least one air permeable surface facing an interior space of the liner;

adhering the liner to the cargo container at a plurality of locations on both bottom and top surfaces of the container so as to conform the liner to the shape of the cargo container;

connecting an interior volume of the at least one air pad to a suction source through a hose member; and drawing air from within the interior space of the liner with each air pad and suction source simultaneously with loading of the bulk material cargo and continuously throughout the loading of the bulk causing the bulk cargo to compact within the liner.

7. The method as in claim 6, further comprising disposing the hose member from the at least one air pad through a wall of the cargo container and wherein said step of connecting the interior volume of the at least one air feed to a suction source comprises connecting to a suction source located outside said cargo container.

* * * * *